UNITED STATES PATENT OFFICE 2,375,168

TREATMENT OF RUBBER AND PRODUCT THEREOF

Albert F. Hardman, Akron, Ohio, assignor to Wingfoot Corporation, Akron, Ohio, a corporation of Delaware No Drawing. Application September 25, 1942, Serial No. 459,663

12 Claims. (Cl. 260—807)

This invention relates to the treatment of rubber with a new antioxidant and the product thereof. The invention includes the vulcanization of rubber in the presence of the anti-oxidant and the vulcanized product.

The antioxidant is made by treating a naphthol, either alpha naphthol or beta naphthol, with formaldehyde and a tertiary amine which contains at least one phenyl group. It apparently is a di-substituted amino phenyl methylene naphthol which may be represented by the following formulas:

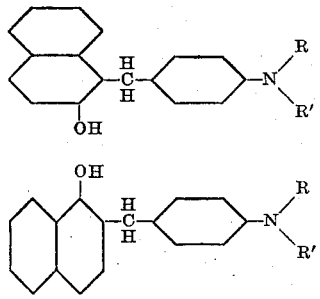

or where R and R' stand for hydrocarbon groups. The aromatic rings may be substituted by other substituents, as for example aryl, alkyl, alkoxy, aryloxy, nitro, nitroso, mercapto or halogen.

To produce the antioxidant alpha naphthol or beta naphthol is reacted with formaldehyde (which may be in the form of paraformaldehyde) and a tertiary amine. R and R' of the above formulas may be the same or different. For example, one might use dimethyl aniline, diethyl aniline, phenyl-ethyl-aniline, N-phenyl-morpholine, N-phenyl-piperidine, N-phenyl-pyrrole, N-phenyl-2,5-dimethyl-pyrrole, tri-phenyl-amine, N-phenyl-pyrrolidine or N-phenyl-pyrroline.

The antioxidants may, for example, be made as follows:

Example 1

62 g. dimethyl aniline
72 g. β-naphthol
15 g. paraformaldehyde
250 cc. toluene, and a few drops of piperidine were mixed in a flask and refluxed with a water trap between the condenser and flask. Water collected rapidly, the theoretical ½ mol. distilling off in ten or fifteen minutes.

The solution on cooling set to a mass of crystals, which on filtering, washing, and drying gave a high yield. The crude crystals melted at 138–9° C., and after recrystallizing from alcohol, melted at 144° C.

The nitrogen content by analysis was found to be 5.07 per cent, while the calculated value for the formula below is 5.05 per cent.

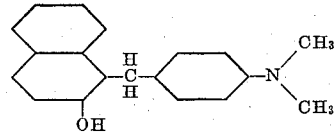

Example 2

33 g. N-phenyl-morpholine
30 g. β-naphthol
6.5 g. paraformaldehyde
100 cc. benzene+a few drops piperidine After refluxing 1½ hours, 3.6 cc. water had collected in the trap. On cooling, a good yield of crystals was obtained. After recrystallizing from alcohol, white crystals were obtained which melted at 176–7° C.

Analysis revealed a nitrogen content of 4.23 per cent while the theoretical value for the formula below is 4.39 per cent:

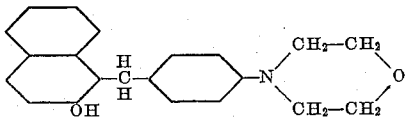

To test the value of these materials as antioxidants they were vulcanized with rubber compounded according to the following formula:

|  | Parts by weight |
|---|---|
| Extracted pale crepe | 100 |
| Zinc oxide | 5 |
| Sulfur | 3 |
| Stearic acid | 1.5 |
| Hexamethylene tetramine | 1 |
| Antioxidant | 1 |

The various vulcanized products were compared with rubber containing an equal amount of phenyl-β-naphthylamine similarly vulcanized. The test products were aged for six days in an oxygen bomb at 50° C. and 150 pounds pressure. The tensile strength of the stock thus treated was compared with the tensile strength of the control. The products of Examples 1 and 2 compared very favorably with the control.

What I claim is:

1. The process of treating rubber which comprises vulcanizing it in the presence of an N,N-dihydrocarbon substituted amino phenyl methylene naphthol.

2. The process of treating rubber which comprises vulcanizing it in the presence of an N,N- dihydrocarbon substituted amino phenyl methylene alpha naphthol.

3. The process of treating rubber which comprises vulcanizing it in the presence of an N,N-dihydrocarbon substituted amino phenyl methylene β-naphthol.

4. Rubber which contains as an antioxidant an N,N-dihydrocarbon substituted amino phenyl methylene naphthol.

5. Rubber which contains as an antioxidant an N,N-dihydrocarbon substituted amino phenyl methylene alpha naphthol.

6. Rubber which contains as an antioxidant an N,N-dihydrocarbon substituted amino phenyl methylene β-naphthol.

7. Rubber which contains as an antioxidant dimethyl amino phenyl methylene β-naphthol.

8. Rubber which contains as an antioxidant morpholyl phenyl methylene β-naphthol.

9. The process of treating rubber which comprises vulcanizing it in the presence of a tertiary amino phenyl methylene naphthol.

10. The process of treating rubber which comprises vulcanizing it in the presence of dimethyl amino phenyl methylene β-naphthol.

11. The process of treating rubber which comprises vulcanizing it in the presence of morpholyl phenyl methylene β-naphthol.

12. Rubber which contains as an antioxidant a tertiary amino phenyl methylene naphthol.

ALBERT F. HARDMAN.